United States Patent [19]

Rhodes

[11] Patent Number: 4,817,505

[45] Date of Patent: Apr. 4, 1989

[54] PISTON WITH STIFFENING STRUCTURE FOR LOWER SKIRT REGIONS

[75] Inventor: Michael L. P. Rhodes, Rugby, England

[73] Assignee: AE PLC, Rugby, England

[21] Appl. No.: 64,002

[22] Filed: Jun. 19, 1987

[30] Foreign Application Priority Data

Jun. 27, 1986 [GB] United Kingdom ............... 8615808

[51] Int. Cl.$^4$ ............... F16J 1/04; F16J 1/08
[52] U.S. Cl. ........................ 92/237; 92/232; 92/239
[58] Field of Search ............. 92/209, 214, 232, 233, 92/237, 239, DIG. 1

[56] References Cited

U.S. PATENT DOCUMENTS

| | | | |
|---|---|---|---|
| 2,149,862 | 3/1939 | Nelson | 92/233 X |
| 2,195,552 | 4/1940 | Alexandrescu | 92/239 X |
| 2,848,287 | 8/1958 | McDuffie | 92/239 X |
| 3,403,605 | 10/1968 | Schmidt | 92/239 X |
| 3,987,709 | 10/1976 | Day | 92/237 X |
| 4,535,682 | 8/1985 | Collyear et al. | 92/239 X |
| 4,648,309 | 3/1987 | Schellman | 92/233 |
| 4,683,808 | 8/1987 | Wacker et al. | 92/239 X |
| 4,691,622 | 9/1987 | Sander et al. | 92/233 |

FOREIGN PATENT DOCUMENTS 720172 12/1954 United Kingdom ............... 92/239

*Primary Examiner*—Robert E. Garrett
*Assistant Examiner*—George Kapsalas
*Attorney, Agent, or Firm*—William R. Hinds

[57] ABSTRACT

Pistons are described having improved stiffness of the lower skirt regions to improve piston guidance and oil film distribution. The pistons comprise a crown portion including piston ring grooves and a skirt portion, the skirt portion being divided into an upper skirt region and a lower skirt region and wherein on each side of the plane including the piston axis and the gudgeon in axis the support skirt region includes at least one bearing surface and the lower skirt region comprises a bearing surface supported by two substantially planar skirt wall sections lying in planes forming an acute angle of less than 75° with the plane which includes the piston and gudgeon pin axes, the maximum bearing contact arc of the lower skirt bearing surface lying between 10° and 22.5° either side of the lane which is normal to the gudgeon pin axis and which includes the piston axis.

11 Claims, 5 Drawing Sheets

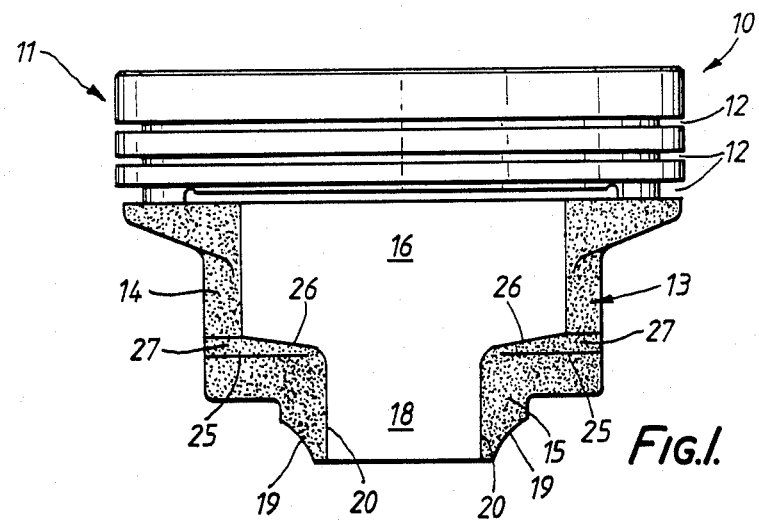
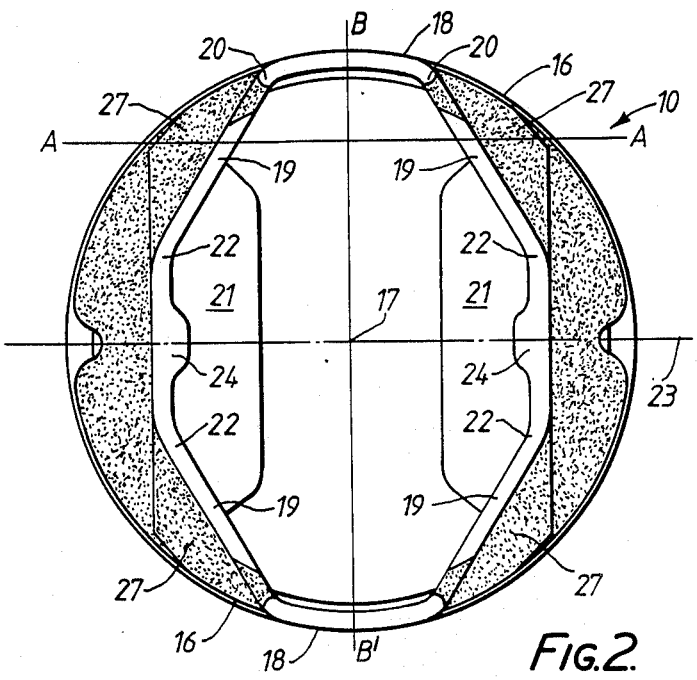

PISTON WITH STIFFENING STRUCTURE FOR LOWER SKIRT REGIONS

BACKGROUND OF THE INVENTION

1. FIELD OF THE INVENTION

The present invention relates to pistons for use in, for example, gasoline and diesel internal combustion engines and in compressors.

2. DESCRIPTION OF THE PRIOR ART

In commonly assigned U.S. Pat. No. 4,535,682 pistons are described having raised, discrete bearing surfaces formed on the piston skirt. The bearing surfaces have cooperating sloping portions which feed lubricant to those bearing surfaces and assist in generating hydrodynamic lubricant films between the bearing surfaces and the associated cylinder wall during operation of the piston in the cylinder. The effect of this is to reduce the degree of friction due to viscous drag between the piston and cylinder and which increases available power and reduces fuel consumption.

In a typical piston of the above type three discrete bearing surfaces may be provided on each of the thrust and counter-thrust portions of the skirt. There may be two bearing surfaces on the axially upper portion of the skirt below the crown and ring belt region and a single bearing surface on the axially lower skirt portion or vice versa. It has been found that when such technology as disclosed in U.S. Pat. No. 4,535,682 is applied to conventional pistons of the types known as full skirt or slipper pistons the flexibility of the lower skirt region may be greater than is desirable from the point of view of piston guidance and oil film distribution.

Strengthening or stiffening of the lower skirt region by thickening of the wall section is unacceptable due to increased weight and loss of control of that degree of flexibility which is desirable. Other methods of stiffening such as the encasting of steel inserts in the piston is again unacceptable due to both weight and production cost considerations.

SUMMARY OF THE INVENTION

It is an object of the present invention to provide a piston having an inherently stiffer lower skirt portion which is therefore guided with greater stability in the cylinder bore.

According to the present invention a piston comprises a crown portion including piston ring grooves and a skirt portion, said skirt portion being divided into an upper skirt region and a lower skirt region wherein on each side of the plane including the piston axis and the gudgeon pin axis said upper skirt region includes at least one bearing surface and said lower skirt region comprises a bearing surface, each bearing surface of said lower skirt region being supported by two substantially planar skirt wall sections lying in planes forming an acute angle of less than 75° with said plane which includes the piston axis and gudgeon pin axis, the maximum bearing contact arc of said lower skirt bearing surface lying between 10° and 22.5° either side of the plane which is normal to the gudgeon pin axis and which includes the piston axis, and wherein substantial parts of the axially lower extremity of said upper skirt region and the axially upper extremity of said lower skirt region are bounded by wall portions extending generally transversely to the piston axis.

In one embodiment of a piston according to the present invention the upper skirt region may be divided so as to form two circumferentially spaced-apart bearing surfaces, the portion of skirt lying between the two bearing surfaces being recessed so that it does not form part of the piston skirt contact area with the associated cylinder wall.

Pistons according to the present invention are not only limited to the type of bearing surface geometry disclosed in U.S. Pat. No. 4,535,682 but may also be employed using more conventional oval turned geometries without the raised bearing areas.

In order that the invention may be more fully understood examples will now be described by way of illustration only with reference to the accompanying drawings of which

DESCRIPTION OF THE DRAWINGS

FIG. 1 shows a view in elevation of a piston according to the present invention;

FIG. 2 shows a view of the underside of the piston of FIG. 1;

DETAILED DESCRIPTION OF THE PREFERRED EMBODIMENTS

Figure 3:
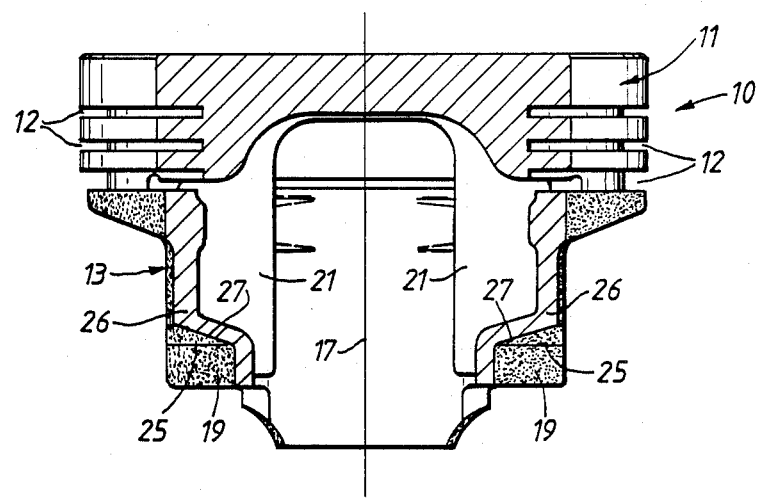
FIG. 3 shows a partly sectioned view in elevation of FIG. 1 through the line A—A of FIG. 2.
Figure 4:
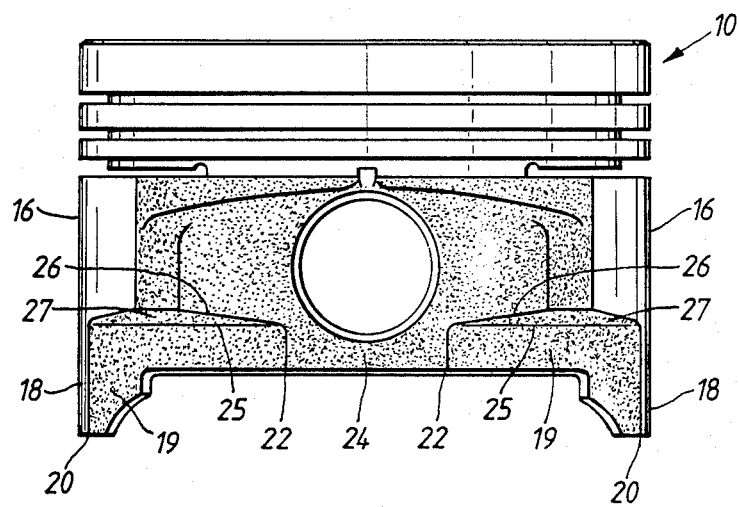
FIG. 4 shows a view in elevation of the piston of FIG. 1 looking along the direction of the gudgeon pin axis.

Referring now to FIGS. 1 to 4 and where the same features are denoted by common reference numerals. A piston is shown generally at 10. The piston comprises a crown portion 11 including piston ring grooves 12 and a skirt portion 13. The skirt portion comprises an upper skirt region 14 and a lower skirt region 15. The upper skirt region 14 includes two relatively wide machined bearing surfaces 16 extending over a total arc of between 30° and 45° either side of the plane $BB^1$ measured from the piston axis 17. The lower skirt region 15 includes two relatively narrow machined bearing surfaces 18 extending over an arc of between approximately 10° and 22.5° either side of the plane $BB^1$ measured from the piston axis 17. The lower bearing surfaces 18 are supported by four substantially planar skirt wall sections 19 which extend from substantially the outer peripheral extremities 20 of the lower bearing surface 18 to the piston-pin bosses 21. The walls 19 form an included acute angle of approximately 60° with the plane parallel to that plane which includes both the piston-pin boss axis 23 and the piston axis 17. The inner ends 22 of the wall sections 19 may not necessarily meet at the plane which includes the piston-pin boss axis 23 and piston axis 17 but may be linked by further skirt sections 24. The upper extremities 25 of the walls 19 of the lower skirt region 15 are joined to the lower extremities 26 of the upper skirt region 14 by wall sections 27 which extend in a generally transverse direction with respect to the piston axis 17. Areas of the figures shaded with dots denote surfaces remaining in the as-cast condition.

The presence of the four planar wall sections 19 at an acute angle to the plane including both the pin boss axis 23 and the piston axis 17 serve to provide stiffer support to the skirt bearing surfaces 18 than would otherwise be the case with conventional curved skirt wall sections. Additionally the generally transverse wall sections 27 also serve to stiffen the lower portions 26 of the upper bearing surfaces 16 and prevent the formation of a relatively weak region in this area without the need to provide thickened sections in the regions corresponding to the bearing surfaces 16. The surfaces 16 and 18 may of course be machined with any polar profiles appropriate to the application in question. In this regard it should be noted that due to the increased effective stiffness of the bearing surface 18 the degree of ovality on this portion may be significantly reduced with consequent benefits in improved performance and, in some cases, reduced noise.

Figure 5:
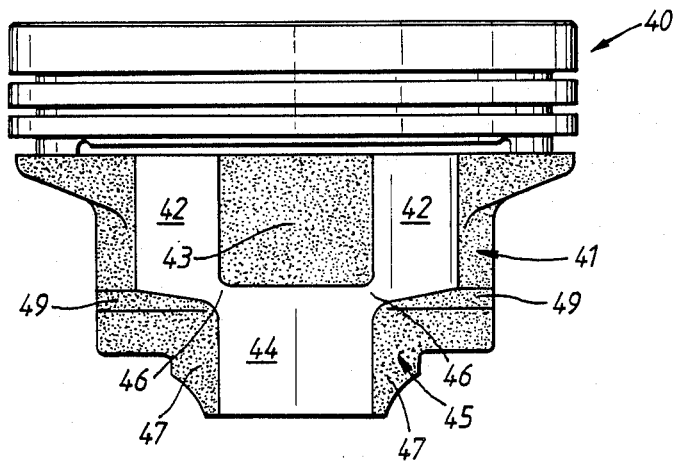
FIG. 5 shows a view in elevation of a first alternative embodiment of a piston according to the present invention.
Figure 6:
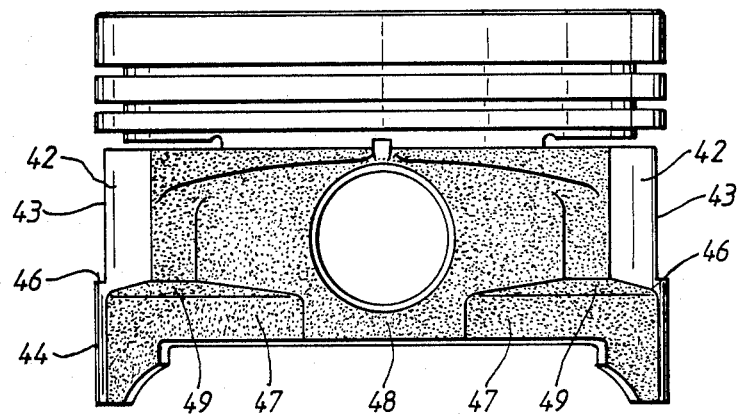
FIG. 6 shows a view in elevation of the piston of FIG. 5 looking along the direction of the gudgeon pin axis.

FIGS. 5 and 6 show a piston 40 of basically similar construction to that shown in FIGS. 1 to 4. In this piston, however, the upper skirt region 41 is divided into two discrete bearing surface areas 42 on each working face. The bearing surface areas 42 are separated by a relieved area 43. The relieved area 43 in this instance is formed by casting during production of the piston blank. It may, however, be formed during machining of the piston bearing surface or by any other means. The surfaces 42 are joined to the bearing areas 44 of the lower skirt region 45 by relatively narrow lands 46. The features relating to the planar wall sections 47, skirt sections 48 normal to the pin boss axis and generally transverse wall sections 49 are essentially as described and shown with reference to FIGS. 1 to 4. The reduced total bearing surface area 42 and 44 compared to that shown in 16 and 18 of FIG. 1 serves to reduce the power consumed by friction in this embodiment.

Figure 7:
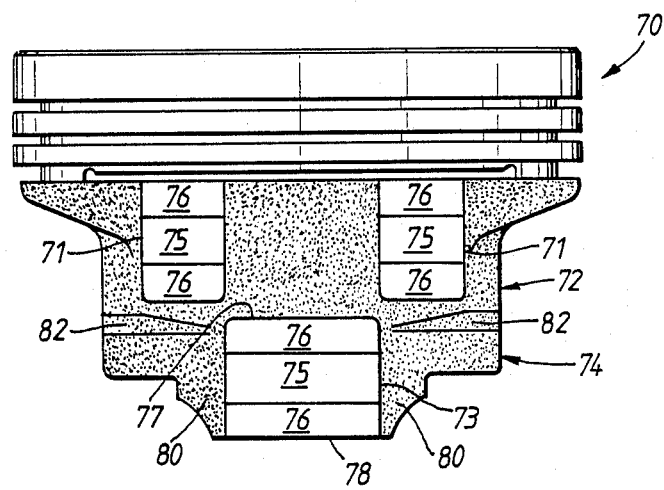
FIG. 7 shows a view in elevation of a second alternative embodiment of a piston according to the present invention.
Figure 8:
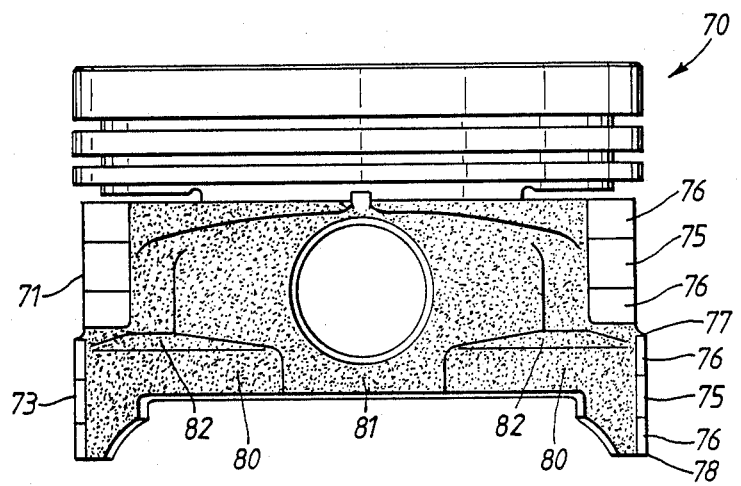
FIG. 8 shows a view in elevation of the piston of FIG. 7 looking along the direction of the gudgeon pin axis, and FIG. 9 which shows a modification which may be made to any of the alternative embodiments.

Frictional losses are reduced still further in the embodiment shown in FIGS. 7 and 8. A piston is shown generally at 70. Bearing surfaces are in the form of three discrete bearing areas on each working face; two areas 71 in the upper skirt region 72 and one area 73 in the lower skirt region 74. The bearing surfaces 71 and 73 are completely separated in this embodiment, having no joining lands although these may be employed in some circumstances. The bearing surfaces 71 and 73 further include features for the generation of hydrodynamic oil films. Raised lands 75 are provided having inclined ramps 76 rising gently in the axial direction from the axial extremities 77 and 78 of, for example, the bearing surface 73 to the raised land 75. The axial profile of the bearing surfaces may be as described in U.S. Pat. No. 4,535,682 of common ownership herewith. The raised lands 75 may be between 10 and 150 microns in radial dimension greater than that of the smallest radial dimension of the ramps 76. As before the features relating to the planar wall sections 80, skirt sections 81 normal to the pin boss axis and generally transverse wall sections 82 may be essentially as described with reference to FIGS. 1 to 4. In this embodiment where the specific pressure on the skirt bearing surface 73 is higher due to the raised land 75 the increased stiffness of the lower skirt region 74 due to the planar walls 80 is particularly advantageous in maintaining the desired oil film distribution.

Figure 9:
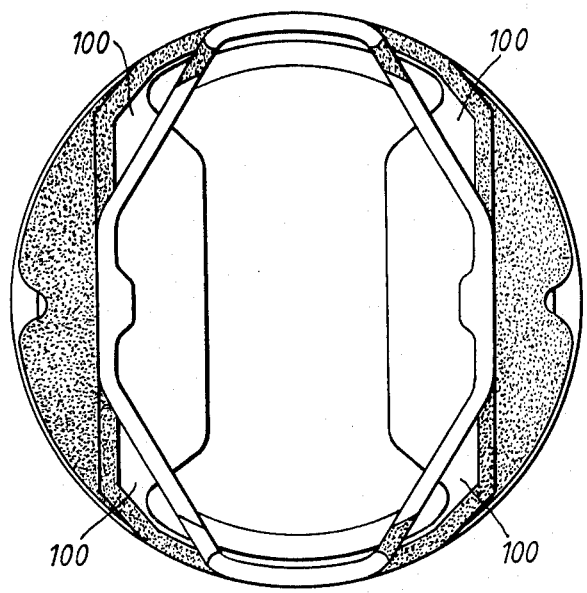

FIG. 9 shows a modification which may be applied to any of the previously described embodiments. The generally transverse walls (27,49,82) may be partially or completely removed by, for example, machining to leave apertures 100. By removing all or part of the transverse wall sections greater control may be exercised over the stiffness of the lower skirt region and of the lower extremity of the upper skirt region.

I claim:

1. A piston comprising a crown portion including piston ring grooves and a skirt portion, said skirt portion being divided into an upper skirt region and a lower skirt region wherein on each side of the plane including the piston axis and the gudgeon pin axis said upper skirt region includes at least one bearing surface and said lower skirt region comprises a bearing surface, each bearing surface of said lower skirt region being supported by two substantially planar skirt wall sections lying in planes forming an acute angle of less than 75° with said plane which includes the piston axis and gudgeon pin axis, the maximum bearing contact arc of said lower skirt bearing surface lying between 10° and 22.5° either side of the plane which is normal to the gudgeon pin axis and which includes the piston axis, and wherein substantial parts of the axially lower extremity of said upper skirt region and the axially upper extremity of said lower skirt region are bounded by wall portions extending generally transversely to the piston axis.

2. A piston according to claim 1 wherein said bearing surfaces in said upper and lower skirt regions are provided with raised lands having inclined ramps above and below.

3. A piston according to claim 1 wherein said generally transversely extending wall portions have apertures formed therein.

4. A piston according to claim 1 wherein said substantially planar skirt wall sections are oriented generally parallel to the piston axis and each extend from substantially an outer peripheral extremity of a bearing surface of said lower skirt region to a connection with an adjacent piston-pin boss.

5. A piston according to claim 1 wherein each planar skirt wall section lies inwardly of an overlying axially adjacent portion of the upper skirt region.

6. A piston according to claim 1 wherein the axially upper extremity of each said substantially planar skirt wall section defines part of the axially upper extremity of said lower skirt region.

7. A piston as claimed in claim 1 wherein part of each planar skirt wall section lies inwardly of an overlying axially adjacent portion of a bearing surface of the upper skirt region.

8. A piston according to claim 1 wherein said transversely extending wall portions extend outwardly from axially upper extremities of said substantially planar skirt wall sections and join them with axially lower extremities of said upper skirt region.

9. A piston according to claim 1 wherein, on each side of the plane including the piston axis and the gudgeon pin axis, said upper skirt region comprises two bearing surfaces separated circumferentially by a recessed portion.

10. A piston according to claim 9 wherein said two bearing surfaces are provided with raised lands having inclined ramps above and below.

11. A piston according to claim 9 wherein the recessed portion is formed during casting of the piston blank.

* * * * *